US011994302B2

(12) United States Patent
Hamp

(10) Patent No.: US 11,994,302 B2
(45) Date of Patent: May 28, 2024

(54) METHOD AND SYSTEM FOR BALANCING MASS FLOW DURING PRODUCTION FAILURE OR INSUFFICIENCY IN A DISTRICT HEATING NETWORK

(71) Applicant: STOCKHOLM EXERGI AB, Stockholm (SE)

(72) Inventor: Quirin Hamp, Hägersten (SE)

(73) Assignee: STOCKHOLM EXERGI AB, Stockholm (SE)

( * ) Notice: Subject to any disclaimer, the term of this patent is extended or adjusted under 35 U.S.C. 154(b) by 565 days.

(21) Appl. No.: 17/294,622

(22) PCT Filed: Nov. 21, 2019

(86) PCT No.: PCT/SE2019/051180
§ 371 (c)(1),
(2) Date: May 17, 2021

(87) PCT Pub. No.: WO2020/106210
PCT Pub. Date: May 28, 2020

(65) Prior Publication Data
US 2022/0010972 A1    Jan. 13, 2022

(30) Foreign Application Priority Data
Nov. 22, 2018    (SE) .................................. 1851448-9

(51) Int. Cl.
*F24D 10/00*    (2022.01)
*F24D 19/10*    (2006.01)
(Continued)

(52) U.S. Cl.
CPC ....... *F24D 10/003* (2013.01); *F24D 19/1015* (2013.01); *G05B 19/042* (2013.01);
(Continued)

(58) Field of Classification Search
CPC .............. F24D 10/003; F24D 19/1015; F24D 2220/0292; F24D 2220/042;
(Continued)

(56) References Cited

U.S. PATENT DOCUMENTS

| 5,460,196 A | 10/1995 | Yonnet |
| 9,766,633 B2 | 9/2017 | Hobi et al. |
| 10,443,217 B2 | 10/2019 | Allmaras et al. |

FOREIGN PATENT DOCUMENTS

| CN | 107726442 | 2/2018 |
| CN | 108844120 | 11/2018 |

(Continued)

*Primary Examiner* — Charles R Kasenge
(74) *Attorney, Agent, or Firm* — DUANE MORRIS LLP; Gregory M. Lefkowitz

(57) ABSTRACT

A method for balancing mass flow during production failure or insufficiency in a district heating network comprising a plurality of substations, each substation comprising at least one primary side connected to the district heating network for transferring heat between the district heating network and the substation, a secondary side connected to least one space heating circuit for heating at least one space connected to the substation, and an adjustable valve arranged between the substation and the district heating network, the valve (102) in each substation being controlled by a heat curve f defining a calculated supply temperature (Tsupply, calc) for the space heating circuit on the secondary side of the substation as a function of a measured outdoor temperature (Toutdoor). The method further comprises a step of heat curve compensation for each substation and population compensation for all substations in the population. The result is then used to control the valve in the respective substation.

11 Claims, 7 Drawing Sheets

(51) Int. Cl.
*G05B 19/042* (2006.01)
*G05D 7/06* (2006.01)
*G05D 23/19* (2006.01)

(52) U.S. Cl.
CPC ....... *G05D 7/0664* (2013.01); *G05D 23/1934* (2013.01); *F24D 2220/0292* (2013.01); *F24D 2220/042* (2013.01); *G05B 2219/2614* (2013.01)

(58) Field of Classification Search
CPC .......... G05B 19/042; G05B 2219/2614; G05D 7/0664; G05D 23/1934; G05D 7/0617; Y02B 30/70; Y02B 30/17; Y02E 20/14; Y10T 137/1963
See application file for complete search history.

(56) References Cited

FOREIGN PATENT DOCUMENTS

| | | | |
|---|---|---|---|
| DE | 102010053211 | 6/2012 | |
| EP | 1564616 | 8/2005 | |
| EP | 2728269 | 5/2014 | |
| EP | 3168541 | 5/2017 | |
| EP | 3179173 | 6/2017 | |
| WO | 2007136344 | 11/2007 | |
| WO | 2012074478 | 6/2012 | |
| WO | WO-2018015508 A1 * | 1/2018 | ........... F24D 10/003 |

* cited by examiner

METHOD AND SYSTEM FOR BALANCING MASS FLOW DURING PRODUCTION FAILURE OR INSUFFICIENCY IN A DISTRICT HEATING NETWORK

CROSS-REFERENCE TO RELATED APPLICATIONS

This application is a § 371 national stage entry of International Application No. PCT/SE2019/051180, filed Nov. 21, 2019, which claims priority to Sweden Patent Application No. 1851448-9, filed Nov. 22, 2018, the entire contents of which are incorporated herein by reference.

TECHNICAL FIELD

The present invention relates in a first aspect to a method for balancing mass flow during production failure or insufficiency in a district heating network. In a further aspect, the invention relates to a system adapted to carry out the method according to the first aspect. In further aspects, the invention relates to a computer program product and carrier for carrying out the method according to the first aspect.

BACKGROUND ART

In the event of production failure or insufficiency in a district heating network, the available power on the primary side (supply) may be insufficient to meet demand on the secondary side (connected properties). A common symptom is a decreased supply temperature on the primary side. Another consequence is reduced or lacking distribution capacity in terms of mass flow for substations at the far end of the distribution lines, i.e. the substations located at the furthest distance from thermal power plants producing district heating and/or from pumping stations in the district heating network located at strategic points depending on the distribution network. Customers in properties/substations located at a long distance from thermal power plants/pumping stations, experience that flow and temperature drop significantly below acceptable level compared to properties/substations at short or medium distances that manage to maintain flow and temperature.

A lack of power be it in terms of either temperature nor pressure difference has the same consequence. Computer substations (Swedish: datorundercentraler, DUC), which locally control the flow of district heating in properties connected to the district heating network, try to maintain power outtake by opening the valves on the primary side of the substation to increase the mass flow over their heat exchanger. This causes an increase in the pressure difference drop, between the supply and return lines, over the distribution pipelines. As a consequence, problems with distribution to so-called "end-of-line" substations might occur.

A production and/or distribution insufficiency causes a chain of consequences on the measurements carried out by the substation:
1. Decrease of the supply temperature on the primary side of the substation
2. Decrease of the supply temperature on the secondary side of the substation, to the space heating and hot water circuits
3. Decrease of distributed power to elements (radiators) in the space to be heated
4. Decrease of return temperature from the space heating and hot water circuits
5. Decrease of the temperature difference between supply and return on the secondary side of the substation in the space heating circuit
6. Reaction in control logic implemented in a substation opening the valves in both space heating and hot water circuits
7. Decrease of the pressure difference between the supply and return lines on the primary side of the substation Hydraulic balancing is disclosed in U.S. Pat. No. 9,766,633 expressly to district heating networks based on a central measurement of the mass flow. Another method for automatic balancing is presented in EP 3179173. Both have in common that a certain nominal flow for each consumer is calculated.

EP 2728269 describes a method how to calibrate a heating system, but does not address how to deal with the "end-of-line" problem. However, none of above-mentioned publications relate to varying distribution capacities that occur when a distribution network is segmented.

EP 3120201 describes how to control the pressure difference in a supply network. However, it is also based on the characterization of individual agents/consumers.

In EP 2021696, a solution for peak-shaving, i.e. load reduction is presented while maintaining a certain Quality of Service (QoS). However, it does not address the "end-of-line" problem.

EP 3168541 describes a system for balancing the flow of a heat transferred fluid in a network with a plurality of consumers, a method comprising regulating control equipment in the form of valves or pumps wherein the associated consumer receives a flow rate of heat fluid which corresponds to a fixed proportion of the total flow rate supplied.

Collapse of the mass flow of these so-called "end-of-line" substations is the problem sought to be solved by the present invention. Thus, in situations of failure to produce district heating (so-called insufficiency or failure situations) a solution is required to achieve two objectives:
1. Eliminate unnecessary pressure drops in a substation
2. The pressure drop in every substation shall guarantee that substations of "end-of-line" customers have enough pressure difference, and thus enough mass flow for power outtake Therefore, a coordinated action among all substations needs to be conceived to ensure that the substations with enough pressure drop to control the mass flow do not withdraw too much power in that they do not drop the pressure difference too much, while the substations close to the far end of the lines will be able to have more mass flow due to higher pressure difference and more power by increasing their power outtake.

SUMMARY OF INVENTION

An object of the present invention to remedy at least some of the problems described above, and to provide an improved solution to counter the "end-of-line" problem of substations located close the far end of the distribution lines in a district heating network.

This is achieved in a first aspect of the invention which relates to a method for balancing mass flow during production failure or insufficiency in a district heating network comprising a plurality of substations, each substation comprising at least one primary side connected to the district heating network for transferring the heat between the district heating network and the substation, a secondary side connected to at least one space heating circuit for heating at least one space connected to the substation, and an adjustable valve arranged between the substation and the district heating network, the valve in each substation being controlled by a heat curve defining a measured supply temperature for the space heating circuit on the secondary side of the substation as a function of a measured outdoor temperature, wherein the method comprises the steps of, for each substation in the district heating network:
  a) measuring an outdoor temperature and setting an emulated outdoor temperature equal to the measured outdoor temperature;
  b) establishing a first control temperature and a second control temperature;
  c) determining the calculated supply temperature on the secondary side of the substation from the heat curve based on the emulated outdoor temperature;
  d) measuring a supply temperature on the primary side of the substation;
  e) comparing the calculated supply temperature on the secondary side of the substation with the measured supply temperature on the primary side of the substation;
    if the calculated supply temperature on the secondary side of the substation is higher than the measured supply temperature on the primary side of the substation, setting the first control temperature equal to the inverse of the heat curve calculated with the measured supply temperature on the primary side of the substation as input value; or
    if the calculated supply temperature on the secondary side of the substation is lower than or equal to the measured supply temperature on the primary side of the substation, setting the first control temperature equal to the emulated outdoor temperature;
  wherein the method further comprises the steps of:
  f) measuring at least one variable associated with a power outtake for each substation, respectively;
  g) calculating a statistical distribution of said at least one variable associated with the power outtake for the entire population of substations;
  h) comparing the current calculated statistical distribution with a statistical distribution from an earlier time with sufficient production; and
    if the current calculated statistical distribution differs from the earlier statistical distribution at sufficient production, increasing the second control temperature by a correction factor; or
    if the current calculated statistical distribution is equal to the earlier statistical distribution at sufficient production, maintaining the second control temperature;
  i) calculating a valve control temperature for each substation, respectively, as a function of the first control temperature for the respective substation and the second control temperature; and
  j) updating the emulated outdoor temperature for each substation, respectively, by setting it equal to the valve control temperature for the respective substation and using the updated emulated outdoor temperature for each substation to control the valve in the respective substation.

The method according to the invention comprises two main steps, a first step called heat curve compensation (HCC) corresponding to step c) to e) above and a second step called population compensation (PC) corresponding to step f) to h) above. The first step is aimed to compensate for calculated supply temperatures of the substations which are physically unattainable, i.e. higher than the actual supply temperature on the primary side of the substation. This is done through a control model in which an input value gives an output value for each substation in the population. The second step is an iterative process aimed at ensuring a fair distribution of mass flow and power over the entire substation in population. This is accomplished by updating the control temperature sent to the substations and is a control model where several input values give the same output value to all substations in the population The result of the two main steps results in a valve control temperature which is a function of a first argument based on the heat curve compensation individually adjusted for the individual substation based on its parameters, and a second argument based on the population compensation which is one and the same for all substations based on the statistical distribution of the entire population. The valve control temperature is thereafter sent to each substation in form of an emulated outdoor temperature and is used to control the valve in the respective substation.

In step b), variables are initiated which thereafter are updated in the main step of the method. Appropriate starting values for the first and second control temperatures can be selected, for example zero or the outdoor temperature.

By means of the method of the present invention, an improved control of a population of substations in a district heating network is achieved, whereby a balancing of the mass flow and power outtake in the substations is achieved so that distribution to substations located at the far end of the pipelines can be maintained, with a certain reduction for the entire population compared to normal operation.

The distinguishing characteristic of the solution according to the present invention is that it does not require control of the pumping stations which generate the pressure difference between the district heating network supply and return lines. In addition, there is no need to measure the mass flow on global distribution lines. In any case, these mass flow measurements are in practice limited in number and only available in discrete positions. The problems are usually not observable with these measurements, especially not in a redundant district heating network. Another feature is that the solution does not require any characterization of the individual agents or exercises any individual control of specific substations, instead all substations are controlled as a group taking into account the conditions (heat curve etc.) in each individual substation.

The main difference compared to the prior art, that is, the innovative part of the present solution, is that instead of relying solely on individual assessment of consumer situations and adapting their individual behaviour, the automatic hydraulic balancing is based on a statistical analysis of the entire population of consumers concerned, without taking into account controlling of the distribution network, i.e. pressure differences, situations for pumping stations or segmentation status of the distribution network.

Furthermore, the same corrective action to mitigate hydraulic deviation can be applied to all consumers. The measure is performed until a statistical distribution of the at least one variable associated with the power outtake is similar to the distribution without the production insufficiency. There are several ways to describe these statistical distributions and to detect a deviation from a nominal statistical distribution. A common way would be to detect the number of modes in a Gaussian mixture model which can be identified by, for example, an expectation maximization algorithm. During normal operation, a normal distribution of mass flows should be present. However, during production insufficiency or failure, the number of modes reflecting at least two classes of consumers arising in this situation, increases: those with sufficient mass flow and those without. In order to determine whether the statistical distributions are similar, the detected modes are compared.

In a preferred embodiment, the measured supply temperature on the primary side of the substation is reduced by a safety parameter offset before being compared with the calculated supply temperature on the secondary side of the substation. By setting an upper limit for the measured supply temperature on the primary side of the substation, it is ensured that the valves in the substations actually are closed in cases where the valves have been fully opened due to production insufficiency or failure.

In an alternative embodiment, the method further comprises a step before step j) comparing for each substation the calculated valve control temperature with the current emulated outdoor temperature, the valve control temperature used in step j) being set equal to the maximum of the calculated valve control temperature and the current emulated outdoor temperature. By using the maximum value of the two temperatures, it is ensured that the highest temperature at any time is used to control the substation, thereby achieving a faster balancing of the mass flow over the entire population of substations. In practice, the calculated valve control temperature will usually be higher as it is incrementally increased at each iteration of the steps in the method.

In a further embodiment, after step j), the method comprises checking whether the production failure or insufficiency has ceased, and:
  if the production failure or insufficiency has ceased, the balancing procedure is cancelled; or
  if the production failure or insufficiency has not ceased, steps c) to j) are repeated.

The check is performed to ensure that the balancing procedure is only continued as long as the production failure or insufficiency exists, to avoid unnecessary control of mass flow and power outtake in the substations. The method avoids resetting the emulated outdoor temperature to the measured outdoor temperature in step a) and resetting the first and second control temperatures to zero, but instead the compensation continues based on the emulated outdoor temperature as well as the first and second control temperatures from the previous iteration of steps c) to j).

In an advantageous embodiment, steps c) to j) are repeated with a delay until the production failure or insufficiency has ceased. By repeating the steps in the method with a delay, the mass flow and power outtake over the entire population of substations can be stabilized before further control is carried out. At the same time, it is ensured that the control temperature is not increased too much under a short period of time, which would result in an unnecessarily large reduction of power outtake over the entire population of substations.

In a preferred embodiment, the at least one variable associated with the power outtake comprises a mass flow through the substation, a setpoint value of the valve opening degree in the substation, the power outtake in the substation and/or a combination thereof. One or more variables associated with the power outtake can be combined in different ways to calculate a reliable statistical distribution, providing a sufficient basis for a comparison of the statistical distribution between different points in time.

In an alternate embodiment, control of the valve in the respective substation is performed by using the updated emulated outdoor temperature, as supply value of the heat curve or to determine an offset of the heat curve of the respective substation. The control of the valve in the respective substation can be carried out in different ways depending on their individual conditions such as, for example, how the control logic is designed.

In a second aspect, the present invention relates to a system for balancing mass flow during production failure or insufficiency in a district heating network comprising a plurality of substations, each substation comprising at least one heat exchanger having a primary side connected to the district heating network for transferring heat between the district heating network and the substation, a secondary side connected to at least one space heating circuit for heating at least one space connected to the substation, and an adjustable valve arranged between the heat exchanger and the district heating network on the primary side of the substation, the valve in each substation being controlled by a heat curve defining a calculated supply temperature for the space heating circuit on the secondary side of the substation as a function of a measured outdoor temperature, the system comprising:
  processing circuitry;
  a memory, wherein said memory contains instructions executable by said processing circuitry; and
  means for communicating with each substation in the district heating network, wherein the system is operative for, for each substation in the district heating network:
  a) measuring an outdoor temperature and setting an emulated outdoor temperature equal to the measured outdoor temperature;
  b) establishing a first control temperature and a second control temperature;
  c) determining the calculated supply temperature on the secondary side of the substation from the heat curve based on the emulated outdoor temperature;
  d) measuring a supply temperature on the primary side of the substation;
  e) comparing the calculated supply temperature on the secondary side of the substation with the measured supply temperature on the primary side of the substation;
    if the calculated supply temperature on the secondary side of the substation is higher than the measured supply temperature on the primary side of the substation, setting the first control temperature equal to the inverse of the heat curve calculated with the measured supply temperature on the primary side of the substation as input value; or
    if the calculated supply temperature on the secondary side of the substation is lower than or equal to the measured supply temperature on the primary side of the substation, setting the first control temperature equal to the emulated outdoor temperature;
  wherein the method further comprises the steps of:
  f) measuring at least one variable associated with a power outtake for each substation, respectively;
  g) calculating a statistical distribution of said at least one variable associated with the power outtake for the entire population of substations;
  h) comparing the current calculated statistical distribution with a statistical distribution from an earlier time with sufficient production; and
    if the current calculated statistical distribution differs from the earlier statistical distribution at sufficient production, increasing the second control temperature by a correction factor; or if the current calculated statistical distribution is equal to the earlier statistical distribution at sufficient production, maintaining the second control temperature;

i) calculating a valve control temperature for each substation, respectively, as a function of the first control temperature for the respective substation and the second control temperature; and j) updating the emulated outdoor temperature for each substation, respectively, by setting it equal to the valve control temperature for the respective substation, using the updated emulated outdoor temperature for each substation to control the valve in the respective substation.

According to other aspects, computer programs and carriers are also provided, the details of which will be described in the claims and the detailed description.

Further possible features and advantages of this solution will be apparent from the detailed description below.

BRIEF DESCRIPTION OF DRAWINGS

The invention is now described in more detail by means of exemplary embodiments and with reference to the accompanying drawings, in which.

DESCRIPTION OF EMBODIMENTS

Figure 1:
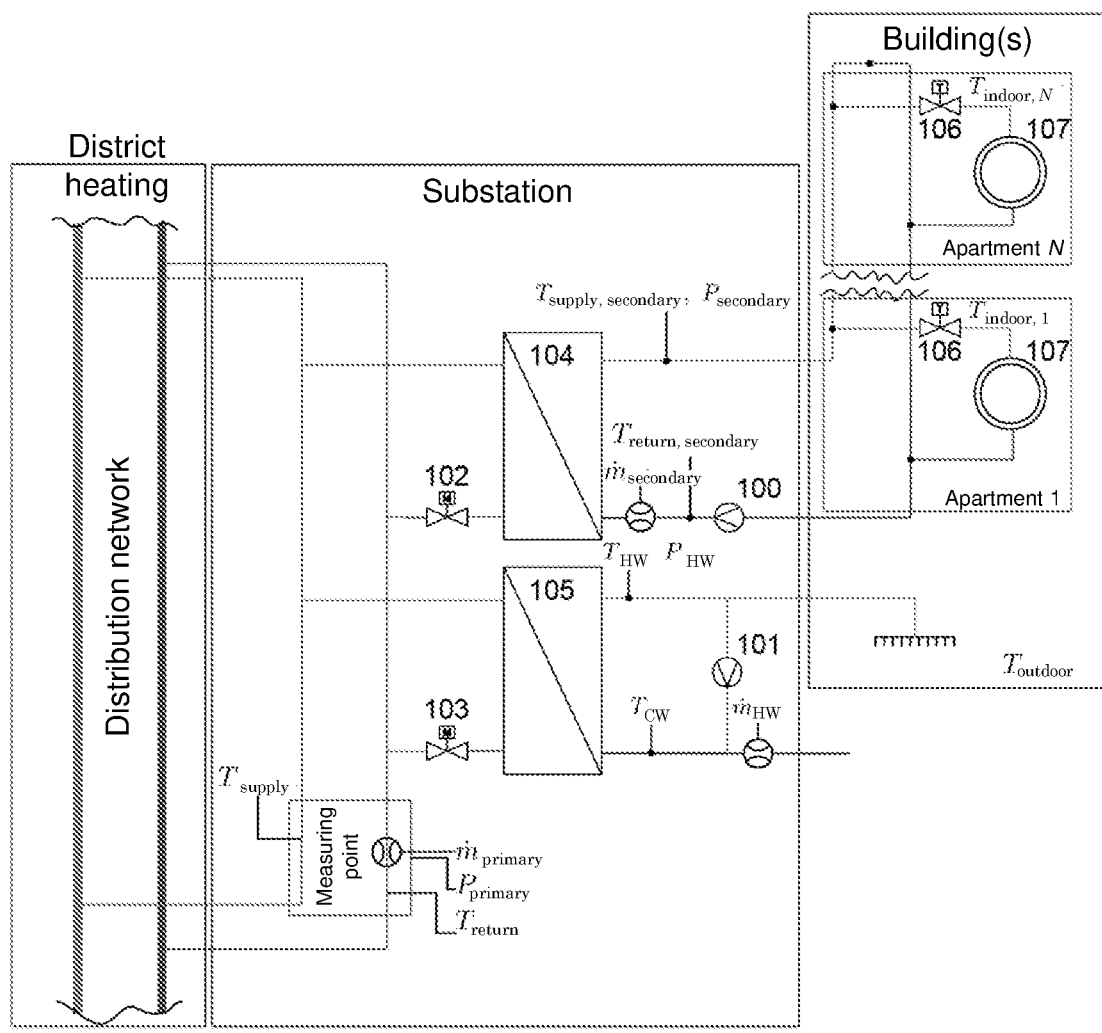
FIG. 1 is a schematic view of a substation in a district heating network.

In the following, a detailed description of a method for balancing mass flow during production failure or insufficiency is presented in a district heating network of the present invention. In the drawings, reference denote are identical or corresponding elements in several of the figures. It will be realized that these figures are only intended to illustrate and in no way limit the scope of the invention.

In the context of the present invention, the solution is based on the following assumptions and limitations. The solution must not rely on measurements of pressure difference or pumping station measurements in the district heating network because they are at discrete points and do not help to identify the "end-of-line" substations in a redundant network if their distribution does not cover the entire cluster.

Similarly, the position of each substation should also be neglected due to the redundant distribution network that may develop over time.

The valves should not be controlled directly because several types of (computer) substation models exist in a cluster and they differ in their control logic of the valve. Therefore, the control target should be achieved by using an indirect control using an individually adapted control signal, for example in the form of an emulated, fictitious outdoor temperature or offset of the heat curve.

It is believed that the population of substations to be balanced comprises at least one substation located near the thermal power plant/pumping station and at least one substation located far away from the thermal power plant/pumping station. In addition, it is assumed that there is a sufficiently large proportion of substations in the population that can be controlled. This is to achieve visibility of the "end-of-line" problem and to be able to perform significant statistical analysis and thereby solve the "end-of-line" problem. It is assumed that there is a service or means to continuously calculate and evaluate the statistical distribution of the relation between power and mass flow in the substations.

FIG. 1 illustrates in a hydraulic diagram an example of a substation in a district heating network. The present invention aims to control balancing a population of substations to achieve mass flow and power outtake across the entire population. The district heating network has a distribution network with two pipelines, a supply line to the left for supplying heated heating medium (water) from a thermal power plant, and a return line to the right for returning cooled water to the thermal power plant. The substation is connected to the district heating network on a primary side (to the left in FIG. 1) through connections to the supply and return lines for transferring heat from the district heating network to the substation. This is achieved, for example, by having the substation in direct or indirect fluid communication with the district heating network's supply and return lines, respectively.

The substation also has a secondary side, to the right of FIG. 1, adjacent to one or more properties/buildings, which in turn comprises one or more spaces/apartments intended to be heated. For this purpose, each property comprises a space heating circuit connected to the secondary side of the substation and which runs in one or more loops in the spaces to be heated and emits heat, for example through radiators and/or floor loops 107. An example of how such a loop can be arranged is shown in FIG. 1 where the supply and return line of the district heating network is connected to the supply and return line of the space heating circuit via a heat exchanger 104 which provides an indirect connection. Of course, it is also possible, within the scope of the present invention, to control substations with direct connection to the district heating network, i.e. without heat exchanger. In such a direct connection, the heating medium (water) of the district heating network also flows in the substation's/property's space heating circuit but is controlled by a valve 102 and/or a local pump 100 in the substation.

In order to control the flow in the space heating circuit, the substation has an adjustable valve 102, in FIG. 1, arranged on the return line on the primary side of the substation. Of course, other positions are possible within the scope of the present invention. The substation comprises a computer substation (DUC) which is arranged to control the opening degree of the valve 102 to determine the flow and thereby the power outtake from the district heating network.

There are different (computer) substation models with different control implementations. Most use two signals to control the valve 102 and thereby the space heating circuit, namely the outdoor temperature $T_{outdoor}$ and the supply temperature $T_{supply,secondary}$ on the secondary side of the substation. The computer in the substation strives for the measured supply temperature $T_{supply,secondary}$ (actual value) on the secondary side of the substation to correspond to a calculated supply temperature (setpoint value) which is determined based on the outdoor temperature $T_{outdoor}$. The determination is made by means of a heat curve $f$ which defines the calculated supply temperature $T_{supply,calc}$ for the space heating circuit on the secondary side of the substation as a function of the measured outdoor temperature $T_{outdoor}$ according to equation (1):

$$T_{supply,calc} = f(T_{outdoor}) \qquad (1)$$

The heat curve can be parameterized in different ways depending on the (computer) substation model. For example, the function $f$ can be linear or consist of polynomial curves. Other factors such as hysteresis settings can affect the function.

The technical description of a typically occurring (computer) substation specifies that the valve 102 of the space heating circuit is controlled by a 3-point control. If the measured supply temperature $T_{supply,secondary}$, on the secondary side of the substation is lower than the calculated supply temperature $T_{supply}$, care for the space heating circuit on the secondary side of the substation, the valve 102 is opened more to increase the power outtake by heat transfer from the district heating network. Conversely, if it is too hot, the valve 102 is closed to lower the power outtake. However, this behaviour does not take into account the supply temperature $T_{supply}$ on the primary side of the substation, i.e. from the district heating network. In the case where the supply temperature $T_{supply}$ on the primary side of the substation is lower than the calculated supply temperature $T_{supply,calc}$ for the space heating circuit on the secondary side of the substation, i.e. the heat supplied from the district heating network is not sufficient to achieve the calculated supply temperature $T_{supply,calc}$ for the space heating circuit on the secondary side of the substation, the valve 102 is opened at maximum, causing an undesirable differential pressure drop between the supply and return line of the district heating network.

The substation also includes an additional circuit for hot water which may have its own connection to the district heating network via a separate heat exchanger 105 where the supply of heat is controlled by a valve 103. For obvious reasons, this circuit is partially open as the hot water used disappears in the drain and is replaced by cold water from the property's main tap. However, water is circulated in the hot water circuit by means of a pump 101. Within the scope of the present invention, it is not intended to control mass flow and power outtake in the hot water circuits of the substations as the need for heating in these is of a more sporadic and short-term nature.

The substation also includes a measuring point for measuring the supply $T_{supply}$ and the return temperature $T_{return}$ respectively, as well as the mass flow $\dot{m}_{primary}$ and/or the power outtake $P_{primary}$ on the primary side of the substation. This measuring point also includes means for communication (not shown) with a central system 600 for monitoring, controlling and charging of delivered district heating. In one embodiment, the substation also comprises gauges for measuring the outdoor temperature $T_{outdoor}$, the position/opening degree as of the valve 102 or its setpoint value, the supply $T_{supply,secondary}$ and the return temperature $T_{return,secondary}$, respectively, and also the mass flow $\dot{m}_{primary}$ and/or power outtake $P_{secondary}$ in the space heating circuit on the secondary side of the substation. The substation is arranged to communicate with the central system 600 to provide the measured values and receive information such as, for example, production insufficiency or failure notices or control signals for controlling the valve 102 in accordance with the method of the present invention.

Figure 2A:
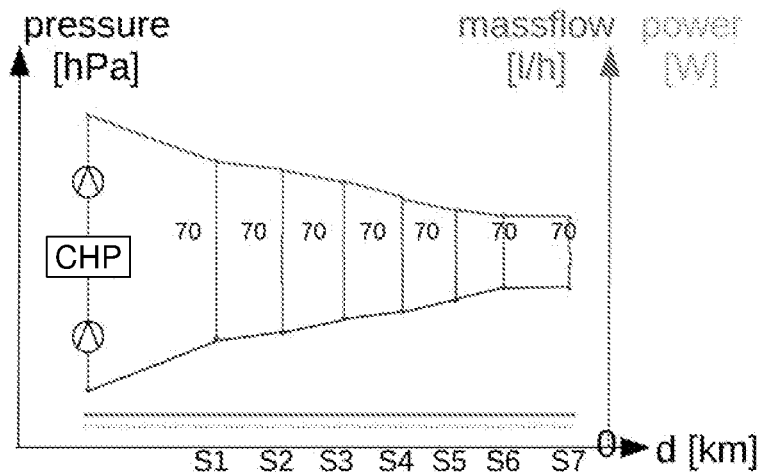
FIG. 2a-2c illustrate pressure difference, mass flow and power in a number of substations in a district heating network at increasing distances from a thermal power plant at different production conditions.
Figure 2B:
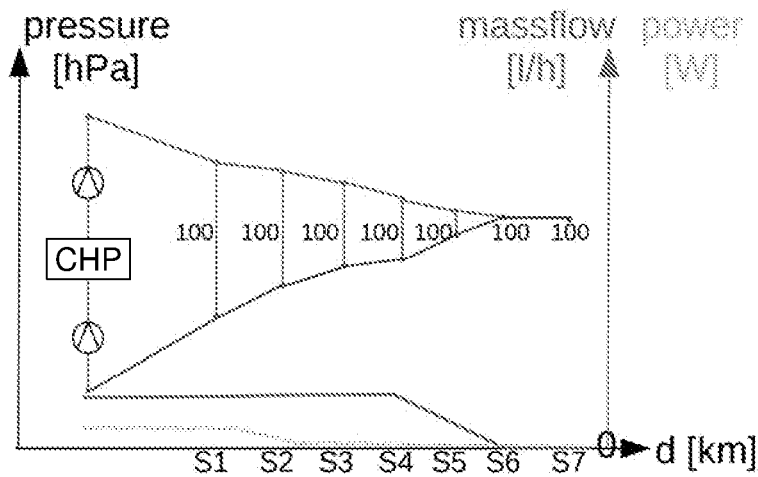
Figure 2C:
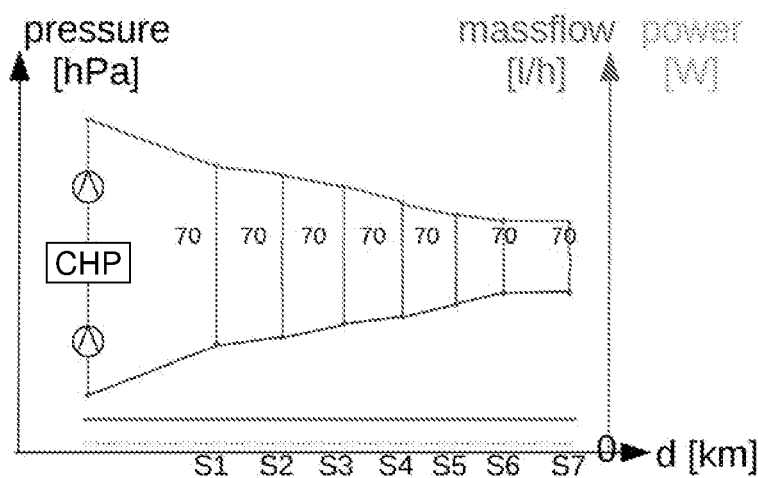

FIG. 2a-2c illustrate how the pressure in the supply and return lines, as well as the mass flow and power outtake, in a number of substations in a district heating network, are affected in different situations. FIG. 2a shows the situation during sufficient production, i.e. when production satisfies the demand for district heating, and where the numbers S1-S7 denote different substations located at an increasing distance from a central thermal power plant, denoted CHP in FIG. 2a-2c. The upper red curve shows the pressure in the supply line and the lower blue curve shows the pressure in the return line at the respective substations S1-S7. As can be ascertained from the curves, the pressure in the supply line decreases with increasing distance from the thermal power plant while the pressure in the return line increases with the distance. The pressure difference between the supply and return lines is thus highest for the substation 1 located closest to the thermal power plant and lowest for the substation 7 located at the furthest distance from the thermal power plant. The number 70 in FIG. 2a denotes the percentage of opening for the valve in the respective substations S1-S7 and constitutes an assumption of the expected opening rate at sufficient production.

At the bottom of FIG. 2a-2c, the same diagram shows how the mass flow (green solid dashed line) and the power outtake (pink dashed line) vary with increasing distance from the thermal power plant. Under sufficient production as in FIG. 2a, the flow and power outtake in the substations is substantially constant for all substations S1-S7.

FIG. 2b illustrates a situation where there is a production insufficiency or failure, i.e. when the thermal power plant is unable to provide enough heated water to the substations in the district heating network. The pressure in the supply line follows essentially the same development as in FIG. 2a with sufficient production, i.e. the pressure decreases with increasing distance from the thermal power plant. The pressure in the return line, on the other hand, increases faster than in FIG. 2a at sufficient production, to the extent that in the substations 6 and 7, furthest away from the thermal power plant, the pressure difference is negligible, substantially equal to zero. This means that the mass flow in these substations cannot be maintained and therefore, as well as the power outtake, drops to zero. The number 100 in FIG. 2b, as in FIG. 2b, denotes the degree of opening of the valves as a percentage, i.e. all valves are expected to be fully open because the supply temperature $T_{supply}$ on the primary side of the substation is lower than the calculated supply temperature $T_{supply,calc}$ on the secondary side of the substation.

FIG. 2c illustrates a situation where there is a production insufficiency or failure, but where control of the valves is performed according to the method of the present invention in order to restore the pressure difference between the supply and return line in all substations to a situation similar to that when the production capacity in the district heating network is sufficient, i.e. when there is no failure or insufficiency, thereby balancing the mass flow and power outtake. As can be ascertained from the lines at the bottom of FIG. 2c, the flow and power outtake are substantially constant in all substations S1-S7 with increasing distances from the thermal power plant, but at a lower level than in FIG. 2a, due to the production insufficiency or failure.

As described above in connection with FIG. 1, the measured outdoor temperature $T_{outdoor}$ is used as an input signal to the assigned heat curve of the substation to control opening and closing of the valve in a substation. Thus, it is possible to control the valves of the substations by influencing which input is sent to the computers of the substations.

Figure 3:
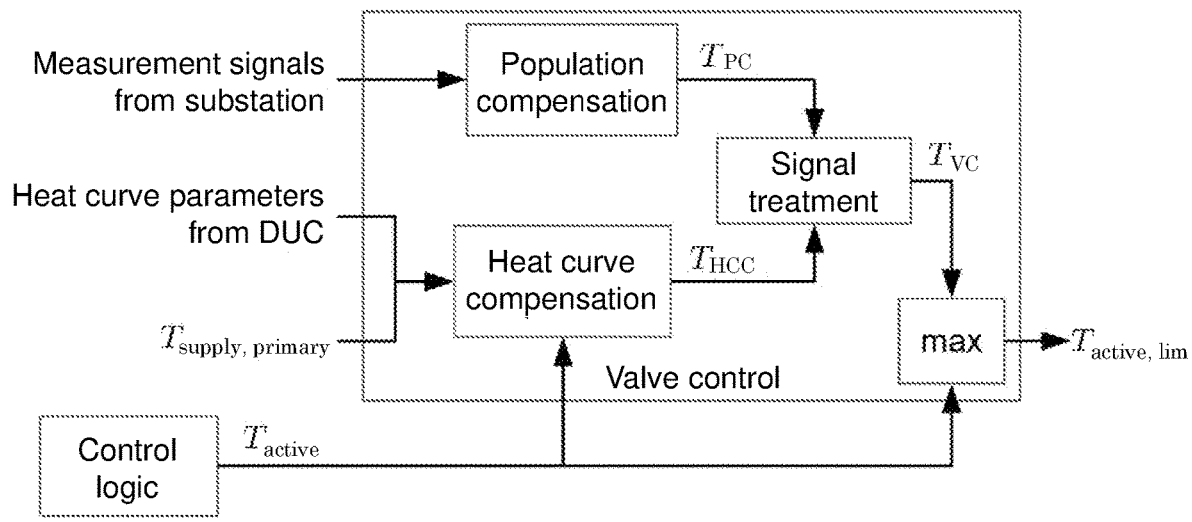
FIG. 3 shows a simple schematic view of a system for controlling the valve in a substation in a district heating network.

FIG. 3 illustrates in a simplified schematic view the main steps of a method according to the present invention. The method comprises two main steps; an individually adjusted heat curve compensation for each substation in a population of substations and a general population compensation for all substations in the population. A control logic sends a control signal in the form of an emulated, fictive outdoor temperature $T_{active}$ as an input signal to the first main step. The emulated outdoor temperature $T_{active}$ initially corresponds to the actual, measured outdoor temperature $T_{outdoor}$, but is updated during the method to achieve the purpose of balancing the flow and power outtake in the population of substations. As additional input signals, the parameters of the heat curve for each substation are used and the measured supply temperature $T_{supply}$ on the primary side of the substation. The heat curve compensation results in an output signal in the form of a control temperature $T_{HCC}$.

Thereafter, the second main step, called population compensation, follows. As an input signal, at least one measured variable is used which is associated with the power outtake in each substation, respectively. This at least one variable can be selected, for example, from a measured mass flow in the respective substation, a measured power outtake in the respective substation and/or a setpoint value, for the valve opening degree in the respective substation. The population compensation results in an output signal in form of a second control temperature $T_{PC}$.

The first and second control temperatures $T_{HCC}$ and $T_{PC}$ are then combined to a valve control temperature $T_{VC}$ which is sent to the control logic in the respective substation in the population of substations to control the valve 102 in the space heating circuit in each substation.

In a possible post-treatment step, the second control temperature $T_{PC}$ can be compared with the emulated outdoor temperature $T_{active}$, where the highest of these is set as control temperature $T_{active,lim}$ to be used as input to the heat curve $f$ for each substation. Thus, the calculated supply temperature $T_{supply,calc}$ on the secondary side of the substation is affected, which in turn controls the opening/closing of the valve for the respective substation.

Figure 4:
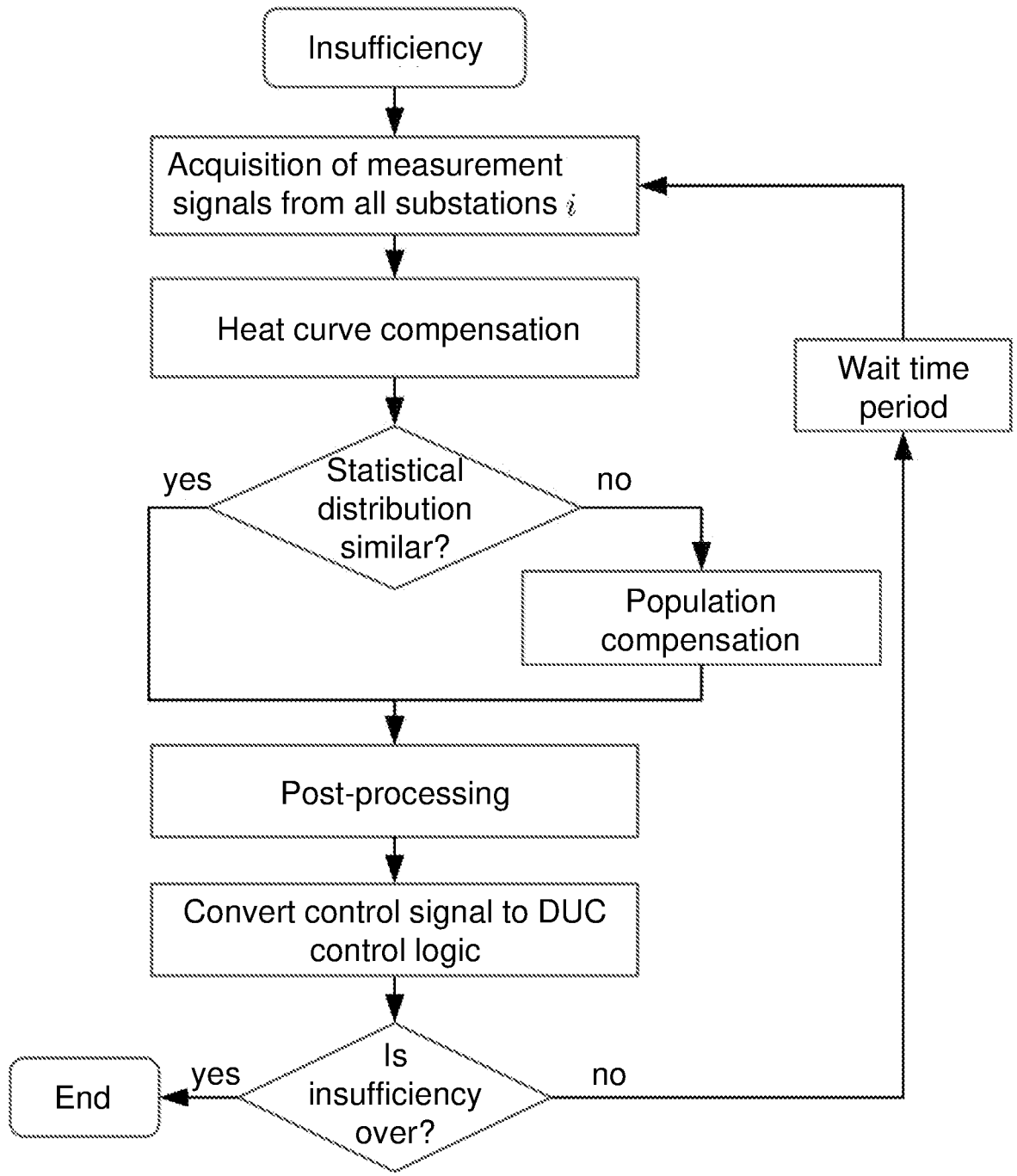
FIG. 4 shows a flow chart of a method for balancing mass flow during production failure or insufficiency in a district heating network comprising a plurality of substations according to one or more embodiments of the present invention.

FIG. 4 illustrates in more detail a flow chart of the method of the present invention. Initially, a production insufficiency or failure is identified as the thermal power plant in the district heating network cannot provide enough heat to meet demand in the connected population of substations. The second control temperature $T_{PC}$ is then set equal to zero. Then, in a first step for each substation i in the population, the supply temperature $T_{supply,i}$ is obtained on the primary side of the substation and at least one variable associated with the power outtake such as the mass flow in the substation $\dot{m}_{primary,i}$ and/or the space heating circuit of the substation $\dot{m}_{secondary,i}$, the power outtake in the substation $P_{primary}$ and/or space heating circuit of the substation $P_{secondary}$ and/or setpoint value for the opening position $\alpha_R$ of the valve 102. Of course, the acquisition of said at least one variable associated with the power outtake can be done separately in a later step since this variable is used first in the population compensation step.

In the next step, heat curve compensation is then carried out for each substation i. This is done by measuring the outdoor temperature $T_{outdoor}$ and setting an emulated outdoor temperature $T_{active}$ equal to the outdoor temperature $T_{outdoor}$ and based on this, determine the calculated supply temperature $T_{supply,calc}$ on the secondary side in the space heating circuit of the substation by means of heat curve $f$ according to equation (1) above.

Then, the supply temperature $T_{supply}$ on the primary side of the substation is compared with the calculated supply temperature $T_{supply,calc}$ on the secondary side in the space heating circuit of the substation. If the calculated supply temperature $T_{supply,calc}$ on the secondary side of the substation is higher than the supply temperature $T_{supply}$ on the primary side of the substation, a first control temperature $T_{HCC}$ equal to the inverse $f^{-1}$ of the heat curve calculated with the supply temperature $T_{supply}$ on the primary side of the substation as input value. Thus, it is ensured that the substation is not controlled to achieve a higher temperature than the district heating network can supply.

If, on the other hand, the calculated supply temperature $T_{supply,calc}$ on the secondary side of the substation, is lower than or equal to the supply temperature $T_{supply}$ on the primary side of the substation, the first control temperature $T_{HCC}$ is set equal to the emulated outdoor temperature $T_{active}$. In this case, the first control temperature $T_{HCC}$ does not need to be adjusted as the substation is already controlled to achieve a temperature lower than that delivered from the district heating network. This relationship is summarized in equation (2):

$$T_{HCC} = \begin{cases} f^{-1}(T_{supply}) & \text{if } f(T_{active}) > T_{supply} \\ T_{active} & \text{else} \end{cases} \qquad (2)$$

In order to ensure that the valves 102 of the substations are closed in those cases where the valves are fully open, an upper limit of the supply temperature $T_{supply,lim}$ on the primary side of the substation can be defined by means of a safety parameter offset according to equation (3):

$$T_{supply,lim} = T_{supply} - \Delta T_{sat} \qquad (3)$$

This upper limit for the supply temperature $T_{supply,lim}$ on the primary side of the substation is then used in the comparison in equation (2) above.

Thus, after the first main stage of heat curve compensation, a first control temperature $T_{HCC}$ is obtained for each substation. Thereafter, the second principal compensation step is performed, where a second control temperature is initially set equal to zero. In this step, the above-mentioned at least one variable associated with the power outtake (mass flow $\dot{m}_{primary}$, power outtake $P_{primary}$, the setpoint value for valve position as etc.) is obtained in each substation if this has not already been obtained. Thereafter, a statistical analysis of the obtained at least one variable associated with the power outtake is performed over the entire population of substations, in order to obtain a statistical distribution of the variable. As a statistical distribution, a type of distribution is advantageously chosen which allows differentiation of two different distributions, i.e. at different times or measurement times. For example, a frequency distribution for the mass flow in the population of substations is calculated, but also other types of distributions, such as probability distributions (normal distribution, Student's t-distribution, Weibull distribution), and variables, such as the power outtake or a set value (setpoint value) for the position of the valves in the population of substation, can be used. As above mentioned, within the scope of the present invention, it is assumed that there is continuous, or at appropriate (regular or irregular) intervals, data obtained and the possibility to perform statistical analysis of such data at past times, for example an earlier time when sufficient production was available. The data can be continuous or discrete.

The current calculated statistical distribution is then compared with a statistical distribution from an earlier time with sufficient production. If the statistical distributions differ from each other, the second control temperature $T_{PC}$ is increased by a correction factor $\Delta T_{PC}$. The correction factor can be a sum or a multiplication of terms that together lead to an increase in the second control temperature $T_{PC}$, which aims to lower the desired supply temperature on the secondary side of the substation and thereby lead to reduced mass flow and power outtake.

On the other hand, if the statistical distributions are equal or similar to a certain predetermined degree, the second control temperature $T_{PC}$ is maintained. This second control temperature $T_{PC}$ is the same for the entire population of substations.

Finally, a valve control temperature is obtained for each substation by calculating a function of the first control temperature $T_{Hcc}$ for each substation and the second control temperature $T_{PC}$ for all substations in equation (4):

$$T_{VC,i} = g(T_{Hcc,i}, T_{PC}) \quad (4)$$

For example, the function g may be the sum of the first and second control temperatures with or without weighting, but also other combinations am possible within the scope of the present invention. The valve control temperature $T_{VC}$ is then used to control the valve 102 in the respective substations. In other words, the emulated outdoor temperature $T_{active}$ which is sent to the substation, is updated by setting it equal to the valve control temperature.

Since the control logic in the computers of the substations may be different, as explained above, the control of the respective substation can be performed in different ways by adapting or converting the control signal to the control logic in the respective substation. In one embodiment, the control is performed by using the updated emulated outdoor temperature $T_{active}$ as input value for the heat curve $f$ in the respective substation, thus determining a new calculated supply temperature on the secondary side of the substation and thereby controlling the valve of the substation to control the flow in the substation and its associated space heating circuit. Alternatively, the updated emulated outdoor temperature $T_{active}$ is used to calculate a (negative) offset of the heat curve in the respective substation. A combination of these two controls can be used depending on the control logic of the respective substation. Both types of control result in the calculated supply temperature $T_{supply,calc}$ on the secondary side of the substation being lowered by a value depending on the updated emulated outdoor temperature $T_{active}$ and which in each case is lower than the normal case, since the calculated supply temperature $T_{supply,calc}$ on the secondary side of the substation is determined using the actual, measured outdoor temperature $T_{outdoor}$.

In a possible post-processing step, the valve control temperature for each substation is compared to the emulated outdoor temperature $T_{active}$, whereby the highest of these values according to equation (5) is used to control the valve in the respective substation:

$$T_{active,lim,i} = \max(T_{active,i}, T_{VC,i}) \quad (5)$$

Thus, it is ensured that the highest temperature at any time, which gives the lowest mass flow/power outtake, is used to control the valves 102 of the substations.

Finally, a check can be performed to verify if the production insufficiency has ceased. If so, the balancing procedure ends with central control of the substations. If the insufficiency is still present, the steps are repeated with heat curve compensation and population compensation, possibly with a time delay $\Delta t$.

Figure 5:
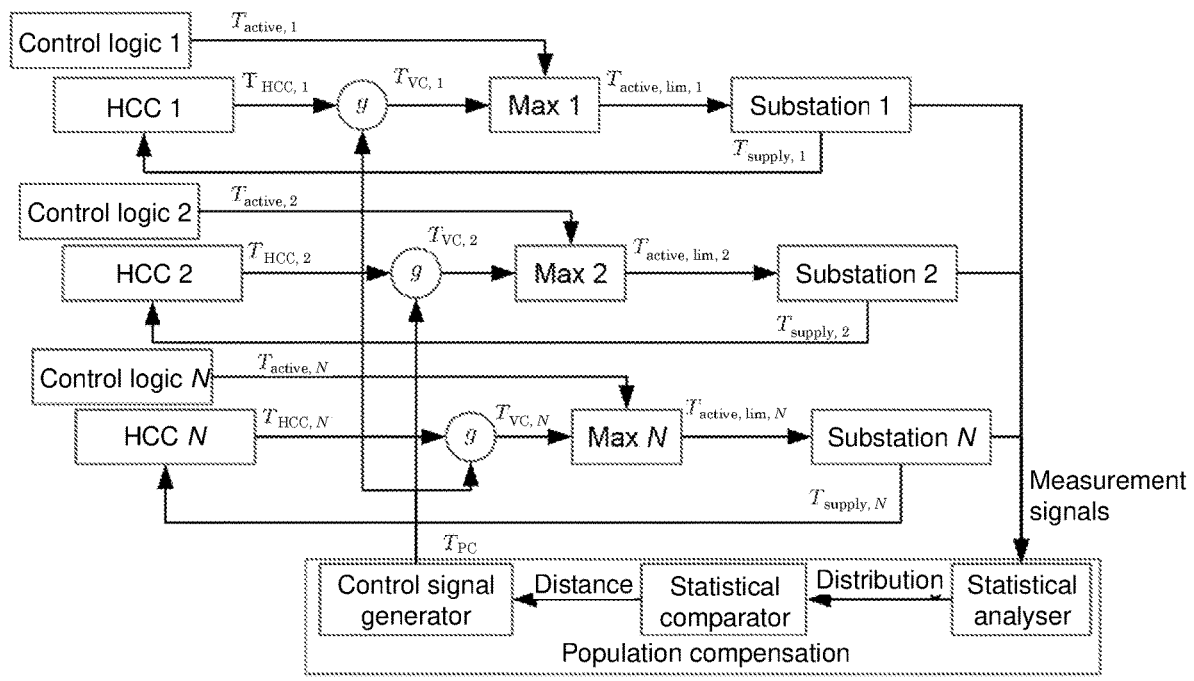
FIG. 5 shows a detailed view of a system for controlling the valves in a population of substations in a district heating network.

FIG. 5 illustrates in detail the system for controlling the substations and their valves. Each substation 1, 2, . . . , N includes a control logic 1, 2, . . . , N. For each substation 1, 2, . . . , N, heat curve compensation (HCC) as described above is performed to obtain the first, individual control temperature. Thereafter, population compensation (PC) for all substations 1, 2, . . . , N in the population is performed by statistical analysis by means of a statistical analyser to calculate a statistical distribution and comparison with means of a statistical comparator with respect to the substations' distance from thermal power plants/pumping stations, as described above to obtain the second common control temperature. The second control temperature $T_{PC}$ is then transmitted in the form of a control signal from a control signal generator to all substations 1, 2, . . . , N and combined with the first control temperature $T_{HCC}$ to calculate a valve control temperature $T_{VC}$ by means of the function g according to equation (4) above, which is optionally compared with the emulated outdoor temperature $T_{active}$ and then used as a control signal for the control logic in each substation 1, 2, . . . , N.

Figure 6A:
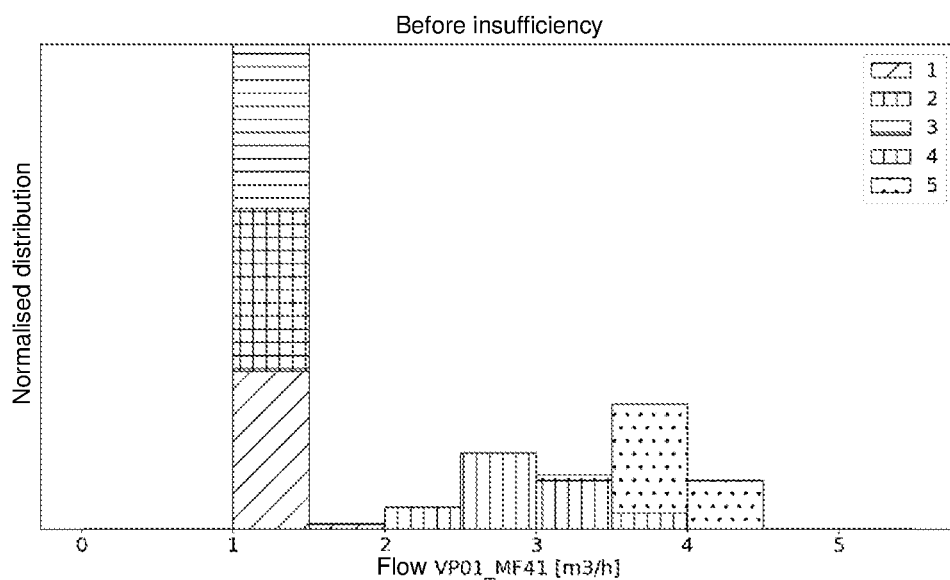
FIGS. 6a and 6b show examples of the frequency distribution of mass flow in a population of substations before and during a production insufficiency or failure, respectively.
Figure 6B:
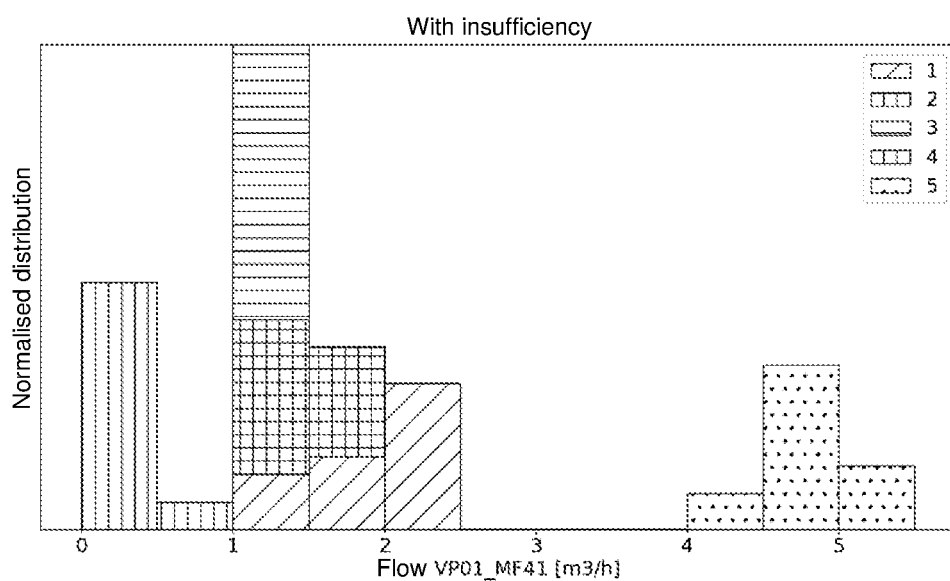

FIGS. 6a and 6b present an example of a statistical distribution to be used in a method of the present invention. Thus, the frequency distribution of the mass flow is shown here in a number of selected substations 1-5 for two 30-minute periods before and during a production insufficiency respectively. Substation 4 is adversely affected by the production insufficiency in that the mass flow drops from a value of about 3 m³/h to about 0.5 m³/h, while the mass flow in the other substations 1, 2, 3 and 5 remains substantially constant or even increases slightly. The conclusion that can be deduced from this is that the substation 4 is probably located further away from the pumping station/thermal power plant, and therefore suffers from the "end-of-line" problem when upstream substations 1, 2, 3 and 5 increase their mass flow (and thereby power outtake) by opening its valves.

Figure 7:
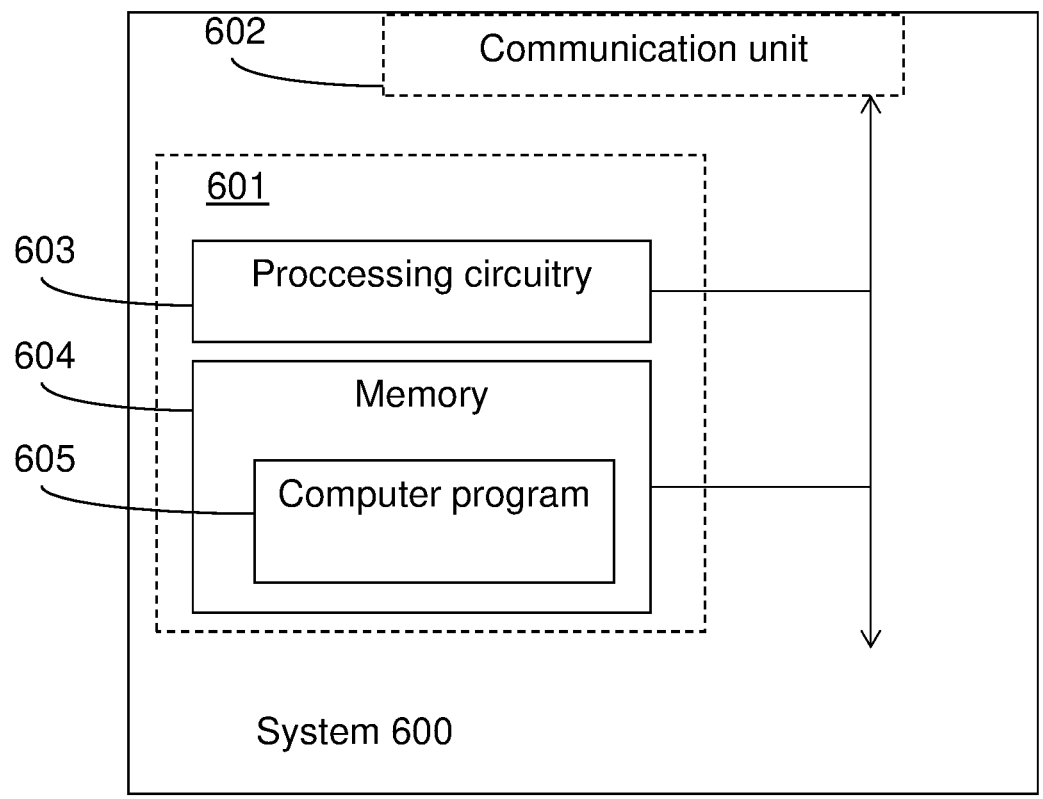
FIG. 7 shows a schematic view of a system for balancing a mass flow in an embodiment of the present invention.

FIG. 7 together with FIG. 1 shows a system 600 which can perform mass flow balancing during production failure or insufficiency in a district heating network comprising a plurality of substations. The system 600 comprises processing circuitry 603 and a memory 604. Processing circuitry 603 may include one or more programmable processors, application specific integrated circuits, field programmable gate arrays, or combinations thereof (not shown) adapted to execute instructions. The memory contains instructions that can be executed by said processing circuitry, whereby the system 600 is operative to obtain from the population of substations i=1, . . . , N the necessary data (measured and calculated temperatures, mass flows, power outtakes, setpoint values for valve positions, etc.). The system 600 is further operative to determine the calculated supply temperature $T_{supply,calc}$ on the secondary side of the substation from the heat curve $f$ based on the emulated outdoor temperature $T_{active}$.

The system 600 is further operative to measure a supply temperature $T_{supply}$ on the primary side of the substation. The system 600 is further operative to compare the calculated supply temperature $T_{supply,calc}$ on the secondary side of the substation with the measured supply temperature $T_{supply}$ on the primary side of the substation; and if the calculated supply temperature $T_{supply,calc}$ on the secondary side of the substation is higher than the measured supply temperature $T_{supply}$ on the primary side of the substation, set the first control temperature $T_{HCC}$ equal to the inverse $f^{-1}$ of the heat curve the calculated supply temperature $T_{supply}$ on the primary side as input value, or if the calculated supply temperature $T_{supply,calc}$ on the secondary side of the substation is lower than or equal to the measured supply temperature $T_{supply}$ on the primary side of the substation, set the first control temperature $T_{HCC}$ equal to the emulated outdoor temperature $T_{active}$.

The system 600 is further operative to measure at least one variable associated with a power outtake for each substation, respectively. The system 600 is further operative to calculate a statistical distribution of the at least one variable associated with the power outtake for the entire population of substations.

The system 600 is further operative to compare the current calculated statistical distribution with a statistical distribution from an earlier time with sufficient production; and if the current calculated statistical distribution differs from the earlier statistical distribution at sufficient production, to increase the second control temperature $T_{PC}$ by a correction factor $\Delta T_{PC}$, or if the current calculated statistical distribution is equal to the previous statistical distribution in sufficient production, to maintain the second control temperature $T_{PC}$.

The system 600 is further operative to calculate a valve control temperature $T_{VC}$ for each substation as a function of the first control temperature $T_{Hcc}$ for the respective substation and the second control temperature $T_{PC}$. The system 600 is further operative to update the emulated outdoor temperature $T_{active}$ for respective substation by setting it equal to the valve control temperature $T_{VC}$ for the respective substation, and to use the updated emulated outdoor temperature $T_{active}$ for the respective substation to control the valve 102 in the respective substation.

In one embodiment, the system 600 is further operative to reduce the measured supply temperature $T_{supply}$ on the primary side of the substation by a safety parameter offset $\Delta T_{saf}$ before comparing it with the calculated supply temperature $T_{supply,calc}$ in the secondary side of the substation.

In one embodiment, the system 600 is further operative to compare the calculated valve control temperature $T_{VC}$ with the current emulated outdoor temperature $T_{active}$ in a step before step j for each substation, wherein the valve control temperature $T_{VC}$ used in step j being set equal to the maximum of the calculated valve control temperature $T_{VC}$ and the current emulated outdoor temperature $T_{active}$.

In one embodiment, the system 600 is further operative to check after step j) whether the production failure or insufficiency has ceased, and if the production failure or insufficiency has ceased, the balancing procedure is interrupted, or if the production failure or insufficiency has not ceased, the steps c) to j) are repeated.

In one embodiment, the system 600 is further operative to repeat steps c) to j) with a delay until the production failure or insufficiency has ceased.

In one embodiment, the statistical distribution is a frequency distribution, or a probability distribution selected from any of the normal distribution, Student's t-distribution and Weibull distribution.

In one embodiment, the system 600 is further operative to detect in step g) the number of modes in a mixture model and compare the modes.

In one embodiment, the at least one variable associated with the power outtake includes a mass flow ($\dot{m}_{primary}$, $\dot{m}_{secondary}$) through the substation, degree of opening ((AO of the valve (102) in the substation, the power outtake ($P_{primary}$, $P_{secondary}$) in the substation and/or a combination thereof.

In one embodiment, the system 600 is further operative to control the valve (102) in the respective substation using the updated emulated outdoor temperature ($T_{active}$) as input value to the heat curve $f$ or to determine an offset of the heat curve $f$ for each substation, respectively.

In some embodiments, the components of the system 600, e.g. the processing circuitry 603 and memory 604, performing the method steps, are a group of network nodes where functionality for performing the method is spread over different physical or virtual nodes in the network. In other words, the components of the system 600 performing the method steps may be a cloud solution, i.e. the components of the system 600 performing the method steps can be deployed as cloud service resources that can be distributed in the network.

The system 600 further comprises a communication unit 602, which may be considered conventional means of communication with relevant units, such as other computers or devices to which it is operatively connected, for example, substations in the district heating network. The instructions which can be executed by said processing circuitry 603 may be arranged as a computer program 605 stored e.g. in memory 604. Processing circuitry 603 and memory 604 may be arranged in a sub-arrangement 601. The sub-arrangement 601 may be a microprocessor and appropriate software and storage therefor, a programmable logic device, PLD or other electronic component (s)/processing circuitry configured to perform the above-mentioned procedures.

The computer program 605 may comprise computer readable code means which, when running in a system 600, cause the system 600 to perform the steps described in any of the described embodiments of the system 600. The computer program 605 can be carried by a computer program product which can be connected to the processor circuit 603. The computer program product may be memory 604. Memory 604 may be realized as, for example, a Random-Access Memory (RAM), a Read-only Memory (ROM), a PROM Memory (Programmable ROM), an (E)EPROM Memory ((Electrically) Erasable PROM). Further, the computer program may be carried by a separate computer readable means, such as a CD, DVD or flash memory, from which the program can be downloaded to memory 604. Alternatively, the computer program may be stored on a server or other device connected to the system 600, to which the system 600 can be accessed through communication unit 602. The computer program can then be downloaded from the server to memory 604.

Preferred embodiments of a method for balancing mass flow during production failure or insufficiency in a district heating network according to the invention have been described. However, those skilled in the art will recognize that this can be varied within the scope of the appended claims without departing from the spirit of the invention.

All of the alternative embodiments described above, or parts of an embodiment may be freely combined or used separately from each other without departing from the spirit of the invention as long as the combination is not contradictory.

REFERENCE NUMERALS $T_{supply}$ Supply temperature on the primary side of the substation
$T_{supply,lim}$ Limit for supply temperature on the primary side of the substation
$\Delta T_{saf}$ Safety parameter offset for the supply temperature on the primary side of the substation
$T_{return}$ Return temperature on the primary side of the substation
$T_{outdoor}$ Outdoor temperature
$T_{active}$ Emulated outdoor temperature
$T_{active,lim}$ Maximum value for the emulated outdoor temperature
$T_{supply,secondary}$ Supply temperature on the secondary side of the substation
$T_{return,secondary}$ Return temperature on the secondary side of the substation
$T_{supply,calc}$ Calculated supply temperature (setpoint value) on the secondary side of the substation
$T_{HCC}$ First control temperature (after heat curve compensation)
$T_{PC}$ Second control temperature (after population compensation)
$\Delta T_{PC}$ Correction factor for the second control temperature (during population compensation)
$T_{VC}$ Valve control temperature
$T_{HW}$ Hot water temperature
$T_{CW}$ Cold water temperature
$T_{indoor,i}$ Indoor temperature in space/apartment i on the secondary side of the substation
$\dot{m}_{primary}$ Mass flow on the primary side of the substation
$\dot{m}_{secondary}$ Mass flow in the space heating circuit on the secondary side of the substation
$\dot{m}_{HW}$ Mass flow in hot water circuit on the secondary side of the substation
$P_{primary}$ Power (outtake) on the primary side of the substation
$P_{secondary}$ Power (outtake) in space heating circuit on the secondary side of the substation
$P_{HW}$ Power (outtake) in the hot water circuit on the secondary side of the substation
$\alpha_R$ Setpoint value for valve position (opening degree) for the control valve of the space heating circuit
$\alpha_{HW}$ Setpoint value for valve position (opening degree) for the control valve of the hot water circuit
100 Pump for space heating circuit
101 Pump for hot water circuit
102 Control valve for space heating circuit
103 Control valve for hot water circuit
104 Heat exchanger for space heating circuit
105 Heat exchanger for hot water circuit
106 Thermostat valve for space heating circuit
107 Radiator for space heating circuit
600 System for balancing the mass flow in a district heating network
601 Sub-grouping
602 Communication unit
603 Processing circuitry
604 Memory
605 Computer program

The invention claimed is:

1. A method for balancing mass flow during production failure or insufficiency in a district heating network comprising a plurality of substations, each substation comprising at least one primary side connected to the district heating network for transferring heat between the district heating network and the substation, a secondary side connected to at least one space heating circuit for heating at least one space connected to the substation, and an adjustable valve arranged between the substation and the district heating network, the valve in each substation being controlled by a heat curve $f$ which defines a calculated supply temperature (Tsupply, calc) for the space heating circuit on the secondary side of the sub station as a function of a measured outdoor temperature (Toutdoor), wherein the method comprises the steps of, for each substation in the district heating network:

a) measuring an outdoor temperature (Toutdoor) and setting an emulated outdoor temperature (Tactive) equal to the measured outdoor temperature;
b) establishing a first control temperature (THcc) and a second control temperature (Tpc);
c) determining the calculated supply temperature (Tsupply, calc) on the secondary side of the substation from the heat curve f based on the emulated outdoor temperature (Tactive);
d) measuring a supply temperature (Tsupply) on the primary side of the substation;
e) comparing the calculated supply temperature (Tsupply, calc) on the secondary side of the substation with the measured supply temperature (Tsupply) on the primary side of the substation;
   if the calculated supply temperature (Tsupply, calc) on the secondary side of the substation is higher than the measured supply temperature (Tsupply) on the primary side of the substation, setting the first control temperature (THcc) equal to the inverse $f^{-1}$ of the heat curve calculated with the measured supply temperature (Tsupply) on the primary side of the substation as input value; or
   if the calculated supply temperature (Tsupply, calc) on the secondary side of the substation is lower than or equal to the measured supply temperature (Tsupply) on the primary side of the substation, setting the first control temperature (THcc) equal to the emulated outdoor temperature (Tactive);

wherein the method further comprises the steps of:
f) measuring at least one variable associated with a power outtake for each substation, respectively;
g) calculating a statistical distribution of said at least one variable associated with the power outtake for the entire population of substations;
h) comparing the current calculated statistical distribution with a statistical distribution from an earlier time with sufficient production; and
   if the current calculated statistical distribution differs from the earlier statistical distribution at sufficient production, increasing the second control temperature (Tpc) by a correction factor (ΔTpc); or
   if the current calculated statistical distribution is equal to the earlier statistical distribution at sufficient production, maintaining the second control temperature (Tpc);
i) calculate a valve control temperature (Tvc) for each substation, respectively, as a function g of the first control temperature (THcc) for the respective substation and the second control temperature (Tpc); and
j) update the emulated outdoor temperature (Tactive) for each substation, respectively, by setting it equal to the valve control temperature (Tvc) for the respective substation, and use the updated emulated outdoor temperature (Tactive) for each substation to control the valve in the respective substation.

2. The method of claim 1, wherein the measured supply temperature ($T_{supply}$) on the primary side of the substation is reduced by a safety parameter offset ($\Delta T_{saf}$) before being compared with the calculated supply temperature ($T_{supply,\ calc}$) on the secondary side of the substation.

3. The method according to claim 1, further comprising a step before step j) of comparing for each substation the calculated valve control temperature ($T_{vc}$) with the current emulated outdoor temperature ($T_{active}$), wherein the valve control temperature ($T_{vc}$) used in step j) is set equal to the maximum of the calculated valve control temperature ($T_{vc}$) and the current emulated outdoor temperature ($T_{active}$).

4. The method according to claim 1, comprising after step j), checking whether the production failure or insufficiency has ceased, and:
   if the production failure or insufficiency has ceased, the balancing procedure is cancelled; or
   if the production failure or insufficiency has not ceased, steps c) to j) are repeated.

5. The method of claim 4, wherein steps c) to j) are repeated with a delay until the production failure or insufficiency has ceased.

6. The method according to claim 1, wherein the statistical distribution is a frequency distribution, or a probability distribution selected from any of the normal distribution, Student's t-distribution and the Weibull distribution.

7. The method according to claim 1, wherein step g) comprises detecting the number of modes in a mixture model and comparing the modes.

8. The method according to claim 1, wherein said at least one variable associated with the power outtake comprises a mass flow ($\dot{m}_{primary}$, $\dot{m}_{secondary}$) through the substation, a setpoint value for the opening degree ($q\ R$) of the valve in the substation, the power outtake ($P_{primary}$, $P_{secondary}$) in the substation and/or a combination of these.

9. The method according to claim 1, wherein control of the valve in each substation, respectively, is carried out by using the updated emulated outdoor temperature ($T_{active}$) as input value to the heat curve f or to determine an offset of the heat curve f of the respective substation.

10. A system for balancing mass flow during production failure or insufficiency in a district heating network comprising a plurality of substations, each substation comprising at least one primary side connected to the district heating network for transferring heat between the district heating network and the substation, a secondary side connected to at least one space heating circuit for heating at least one space connected to the substation, and an adjustable valve arranged between the substation and the district heating network, the valve in each substation being controlled by a heat curve f which defines a calculated supply temperature ($T_{supply,\ calc}$) for the space heating circuit on the secondary side of the substation as a function of a measured outdoor temperature ($T_{outdoor}$), wherein the system comprises:
   processing circuitry;
   a memory, wherein said memory contains instructions executable by said processing circuitry; and
   means for communicating with each substation in the district heating network, wherein the system is operative for, for each substation in the district heating network:
   a) measuring an outdoor temperature ($T_{outdoor}$) and setting an emulated outdoor temperature ($T_{active}$) equal to the measured outdoor temperature;
   b) establishing a first control temperature ($T_{Hcc}$) and a second control temperature ($T_{pc}$);
   c) determining the calculated supply temperature ($T_{supply,\ calc}$) on the secondary side of the substation from the heat curve f based on the emulated outdoor temperature ($T_{active}$);
   d) measuring a supply temperature ($T_{supply}$) on the primary side of the substation;
   e) comparing the calculated supply temperature ($T_{supply,\ calc}$) on the secondary side of the substation with the measured supply temperature ($T_{supply}$) on the primary side of the substation;
      if the calculated supply temperature ($T_{supply,\ calc}$) on the secondary side of the substation is higher than the measured supply temperature ($T_{supply}$) on the primary side of the substation, setting the first control temperature ($T_{Hcc}$) equal to the inverse $f^{-1}$ of the heat curve calculated with the measured supply temperature ($T_{supply}$) on the primary side of the substation as input value; or
      if the calculated supply temperature ($T_{supply,\ calc}$) on the secondary side of the substation is lower than or equal to the measured supply temperature ($T_{supply}$) on the primary side of the substation, setting the first control temperature ($T_{Hcc}$) equal to the emulated outdoor temperature ($T_{active}$);
   wherein the system is further operative for:
   f) measuring at least one variable associated with a power outtake for each substation, respectively;
   g) calculating a statistical distribution of said at least one variable associated with the power outtake for the entire population of substations;
   h) comparing the current calculated statistical distribution with a statistical distribution from an earlier time with sufficient production; and
      if the current calculated statistical distribution differs from the earlier statistical distribution at sufficient production, increasing the second control temperature ($T_{PC}$) by a correction factor ($\Delta T_{PC}$); or
      if the current calculated statistical distribution is equal to the earlier statistical distribution at sufficient production, maintaining the second control temperature ($T_{PC}$);
   i) calculating a valve control temperature ($T_{VC}$) for each substation, respectively, as a function g of the first control temperature ($T_{Hcc}$) for the respective substation and the second control temperature ($T_{PC}$); and
   j) updating the emulated outdoor temperature ($T_{active}$) for each substation, respectively, by setting it equal to the valve control temperature ($T_{VC})_C$ for the respective substation and use the updated emulated outdoor temperature ($T_{active}$) for each substation to control the valve in the respective substation.

11. A non-transitory computer readable medium storing a computer program comprising computer readable code means intended to be executed in a system for balancing mass flow during production failure or insufficiency in a district heating network comprising a plurality of substations, each substation comprising at least one primary side connected to the district heating network for transferring heat between the district heating network and the substation, a secondary side connected to at least one space heating circuit for heating at least one space connected to the substation, and an adjustable valve arranged between the substation and the district heating network, the valve in each substation being controlled by a heat curve f defining a calculated supply temperature ($T_{supply,\ calc}$) for the space heating circuit on the secondary side of the substation as a function of a measured outdoor temperature ($T_{outdoor}$), wherein said computer readable code means when executed in the system causes the system to perform the following steps, for each substation in the district heating network:
a) measuring an outdoor temperature ($T_{outdoor}$) and setting an emulated outdoor temperature ($T_{active}$) equal to the measured outdoor temperature;
b) establishing a first control temperature ($T_{Hcc}$) and a second control temperature ($T_{PC}$);
c) determining the calculated supply temperature ($T_{supply,\ calc}$) on the secondary side of the substation from the heat $f^{-1}$ based on the emulated outdoor temperature (Tactive);
d) measuring a supply temperature ($T_{supply}$) on the primary side of the substation;
e) comparing the calculated supply temperature ($T_{supply,\ calc}$) on the secondary side of the substation with the measured supply temperature ($T_{supply}$) on the primary side of the substation;
  if the calculated supply temperature ($T_{supply,\ calc}$) on the secondary side of the substation is higher than the measured supply temperature ($T_{supply}$) on the primary side of the substation, setting the first control temperature ($T_{Hcc}$) equal to the inverse $f^{-1}$ of the heat curve calculated with the measured supply temperature ($T_{supply}$) on the primary side of the substation as input value; or
  if the calculated supply temperature ($T_{supply,\ calc}$) on the secondary side of the substation is lower than or equal to the measured supply temperature ($T_{supply}$) on the primary side of the substation, setting the first control temperature ($T_{Hcc}$) equal to the emulated outdoor temperature ($T_{active}$);
wherein the system is further caused to perform the steps of:
f) measuring at least one variable associated with a power outtake for each substation, respectively;
g) calculating a statistical distribution of said at least one variable associated with the power outtake for the entire population of substations;
h) comparing the current calculated statistical distribution with a statistical distribution from an earlier time with sufficient production; and
  if the current calculated statistical distribution differs from the earlier statistical distribution at sufficient production, increasing the second control temperature ($T_{PC}$) by a correction factor ($\Delta T_{PC}$); or
  if the current calculated statistical distribution is equal to the earlier statistical distribution at sufficient production, maintaining the second control temperature ($T_{PC}$);
i) calculating a valve control temperature ($T_{VC}$) for each substation, respectively, as a function g of the first control temperature ($T_{Hcc}$) for the respective substation and the second control temperature (Tpc); and
j) updating the emulated outdoor temperature ($T_{active}$) for each substation, respectively, by setting it equal to the valve control temperature (Tvc) for the respective substation and using the updated emulated outdoor temperature (Tactive) for each substation to control the valve in the respective substation.

* * * * *